United States Patent Office 2,930,809
Patented Mar. 29, 1960

2,930,809

AMINOALKYLSILICON COMPOUNDS AND PROCESS FOR PRODUCING SAME

Victor B. Jex, Kenmore, and Donald L. Bailey, Snyder, N.Y., assignors to Union Carbide Corporation, a corporation of New York No Drawing. Application October 12, 1956
Serial No. 615,466

15 Claims. (Cl. 260—448.8)

This invention relates in general to the synthesis of organosilicon compounds. More particularly, the invention is concerned with the production of organosilicon compounds containing, among other possible functional groups, an amino functional group linked to the silicon atom or atoms thereof through an aliphatic hydrocarbon linkage in a position removed from the silicon nucleus by at least three carbon atoms and to organosilicon compounds containing an aminobutylsilyl grouping as new compositions of matter. The invention is further concerned with a process for producing compounds of the general class described.

The present invention is based, in part, upon our discovery that organosilicon compounds containing an amino group attached to the silicon atom thereof through a polymethylene linkage can be produced by the hydrogenation of cyanoalkyl silicon compounds. The overall reaction can be graphically represented by the following equation:

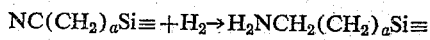

$$NC(CH_2)_a Si\equiv + H_2 \rightarrow H_2NCH_2(CH_2)_a Si\equiv$$

wherein (a) can be any number having a value greater than one.

According to our studies, the basic reaction as illustrated above is equally applicable to the cyanoalkylalkoxysilanes and the cyanoalkylpolysiloxanes. Typical of the cyanoalkylalkoxysilanes suitable for use as our organosilicon starting materials are those compounds represented by the structural formula:

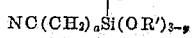

$$NC(CH_2)_a Si(OR')_{3-y}$$

wherein R represents either an alkyl group or an aryl group, R' represents an alkyl group, y is a number having a value of from 0 to 2 and (a) is a number having a value greater than one. Illustrative of the alkyl groups which R and R' can represent include methyl, ethyl, propyl, butyl and the like, while illustrative of the aryl groups which R can represent are phenyl, naphthyl, tolyl and the like. Such cyanoalkylalkoxysilanes include beta-cyanoethyltriethoxysilane, beta-cyanoethyltripropoxysilane, beta-cyanoethylmethyldiethoxysilane, beta-cyanoethylphenyldiethoxysilane, beta-cyanoethyldimethylethoxysilane, beta-cyanopropyltriethoxysilane, gamma-cyanopropyltriethoxysilane, gamma-cyanopropylmethyldiethoxysilane, gamma-cyanopropylphenyldiethoxysilane, delta-cyanobutyltriethoxysilane, delta-cyanobutylmethyldiethoxysilane, delta-cyanobutylphenyldiethoxysilane and the like.

Cyanoalkylpolysiloxanes suitable for use as our starting materials are those polysiloxanes which contain the structural unit:

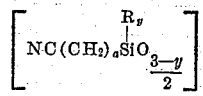

$$\left[ NC(CH_2)_a \underset{R_y}{Si} O_{\frac{3-y}{2}} \right]$$

wherein R and y have the values defined above. Such polysiloxanes include: the trifunctional cyanoalkylpolysiloxanes (i.e. where y=0) such as betal-cyanoethylpolysiloxane, gamma-cyanopropylpolysiloxane, the difunctional cyanoalkylalkylpolysiloxanes and cyanoalkylarylpolysiloxanes (i.e. where y=1) of the cyclic and linear variety such as the cyclic trimer and tetramer of beta-cyanoethylmethylsiloxane and gamma-cyanopropylsiloxane, and the linear beta-cyanoethylmethyl-, gamma-cyanopropyl- and delta-cyanobutylpolysiloxanes, and the monofunctional cyanoalkyldialkyl-, cyanoalkyldiaryl- and cyanoalkylalkylarylsiloxanes (i.e. where y=2).

Cyanoalkylalkoxysilanes and cyanoalkylpolysiloxanes of the type defined above and processes for their production are disclosed and claimed in copending U.S. applications Serial No. 555,201 filed December 23, 1955, and Serial No. 555,203 filed concurrently therewith.

Our process can be carried out by forming a mixture of a cyanoalkyl silicon compound, hydrogen and a suitable catalyst and heating the mixture to a temperature sufficiently elevated to cause the starting materials to react. There results or is produced by the addition of hydrogen to the cyano group and by subsequent reactions, a mixture of the mono-, bis- and tris-aminoalkyl silicon compounds.

In carrying out our process, the hydrogenation of cyanoalkyl silicon compounds is best conducted in a closed system, as for example in a pressure vessel, or in apparatus designed for flowing reactants which permit the maintenance of a closed system at pressures above atmospheric pressure. To provide for the carrying out of the reaction at a desirable rate we prefer to charge the system, within which the reaction is conducted, to a considerable pressure with the hydrogen reactant. In general we have found it convenient to conduct the reaction under a pressure of at least 500 pounds per square inch.

The temperatures at which hydrogen and a cyanoalkyl silicon compound react to form an aminoalkyl silicon compound are not narrowly critical and can vary over a wide range. We have conducted the reaction at temperatures as low as 80° C. and at temperatures as high as 140° C. with good results. Temperatures below 80° C. as for example about 50° C. and above 140° C. can be employed, however, no commensurate advantage is obtained thereby.

The relative amounts of hydrogen and the cyanoalkyl silicon compound employed in our process are not narrowly critical. The compounds can be employed in chemically equivalent amounts; however we prefer to employ hydrogen in an amount above that required to completely reduce the cyano group of the cyanoalkyl silicon reactant. An excess of hydrogen is also, as hereinabove disclosed, desired to provide sufficient pressure for the reaction to proceed at a desirable rate. We have found it convenient to employ the hydrogen reactant in an amount of from about 2 to about 20 chemical equivalents per chemical equivalent of the cyanoalkyl silicon reactant.

As hereinabove described the hydrogenation of cyanoalkyl silicon compounds produces a mixture of the mono-, bis- and tris-substituted amines. The overall reaction can be graphically represented by the following equation which depicts, for the purpose of illustration, the reaction of hydrogen with beta-cyanopropyltriethoxysilane:

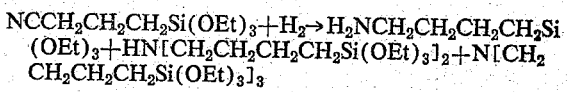

$$NCCH_2CH_2CH_2Si(OEt)_3 + H_2 \rightarrow H_2NCH_2CH_2CH_2CH_2Si(OEt)_3 + HN[CH_2CH_2CH_2CH_2Si(OEt)_3]_2 + N[CH_2CH_2CH_2CH_2Si(OEt)_3]_3$$

We have found that the relative proportion of the mono-, bis- and tris-substituted amine products of our process can be controlled by conducting the reaction in the presence of ammonia. More specifically, we have found that when ammonia is present during the reaction between hydrogen and a cyanoalkyl silicon compound, the course of the reaction is directed toward the production of the mono-substituted amine compounds. By way of illustration, when gamma-cyanopropyltriethoxysilane is hydrogenated in the absence of ammonia a yield of less than 25 mole percent of delta-aminobutyltriethoxysilane is obtained. On the other hand, when the same reaction is conducted in the presence of ammonia in an amount of about 20 moles of ammonia per mole of gamma-cyanopropyltriethoxysilane employed, the yield of delta-aminobutyltriethoxysilane is increased to about 80 mole percent.

The amount of ammonia which can be employed in our process to increase the yield of the mono-substituted amine reaction products can vary over a wide range. We can employ the ammonia in an amount of from about 1 to about 50 moles and higher per mole of the cyanoalkyl silicon compound present in the reaction mixture. Amounts of ammonia in greater mole ratios than those suggested above can also be employed. However, no material advantage is obtained thereby.

We can employ as catalysts for the reaction between hydrogen and the cyanoalkyl silicon compounds, any of those metals or compounds known to be effective in promoting hydrogenation reactions. The platinum metals such as platinum and palladium can be employed alone or in combination with a suitable inert support, or in combination with gamma-alumina. We can also employ nickel as well as Raney nickel and Raney cobalt and certain cyclopentadiene metals such as bis(cyclopentadienyl)nickel.

The reaction between hydrogen and the cyanoalkyl silicon compounds can be carried out within a suitable liquid organic compound in which our starting materials are soluble and with which they are non-reactive. Suitable for use in our process are: the alkanols as for example ethanol, propanol and the like, the aromatic hydrocarbons as for example benzene, toluene and the like. The amount of the liquid organic compound which can be employed as a solvent for the reaction is not narrowly critical and can vary over a wide range. We can employ such compounds in an amount of from about 50 to about 500 parts per 100 parts of the cyanoalkyl reactant.

Our process makes possible the production of alkoxysilylbutylamines, which as far as is known have not been heretofore prepared. Such compounds are characterized by properties not found or even suggestive of their lower homologues as for example, the alkoxysilylpropylamines which are disclosed and claimed in our copending U.S. application Serial No. 483,421, filed January 21, 1955, now U.S. Patent No. 2,832,754, granted April 29, 1958, or the alkoxysilylmethylamines of the art which are known to be unstable.

The alkoxysilylbutylamines of our invention can be graphically represented by the formula:

wherein R' represents an alkyl group such as methyl, ethyl, propyl, butyl and the like, R represents a hydrocarbon group including an alkyl group such as methyl, ethyl, propyl, butyl and the like, or an aryl group such as phenyl, tolyl, naphthyl and the like, and $(x)$ and $(y)$ are integers having values of from 0 to 2. Illustrative of the alkoxysilylbutylamines of the invention are triethoxysilylbutylamine, tripropoxysilylbutylamine, diethoxymethylsilylbutylamine, diethoxyethylsilylbutylamine, diethoxyphenylsilylbutylamine, ethoxydimethylsilylbutylamine, bis(triethoxysilylbutyl)amine, tris(triethoxysilylbutyl)amine, bis(diethoxymethylsilylbutyl)amine, tris(diethoxyphenylsilylbutyl)amine and the like.

The compounds of our invention, particularly the dialkoxymethylsilylbutylamines, unlike their homologues, referred to above, are extremely poisonous and find wide utility in the preparation of pesticides, fungicides, insecticides and herbicides as is hereinafter set forth. Such compounds have also been employed as sizes for fibrous glass materials as is disclosed and claimed in copending U.S. application Serial No. 615,482 filed concurrently herewith. It has also been found that our compounds by virtue of their amino group are useful in the synthesis of monomeric and polymeric organosilicon compounds.

Our process is broadly applicable to the production of aminoalkyl silicon compounds including monomers which can be represented by the formula:

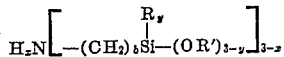

wherein R, R', $(x)$ and $(y)$ have the values previously described, $(b)$ has a value of at least 3 and polymers which can be represented by the unit:

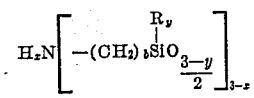

wherein R, $(b)$, $(x)$ and $(y)$ also have the values previously described which are cyclic materials or which are trifunctional materials containing silicon-bonded hydroxyl and/or alkoxy groups as well as end-blocked linear polymers. Such polymers are disclosed and claimed in copending U.S. application Serials Nos. 615,507, 615,481 and 615,483 filed concurrently herewith, the latter two now being abandoned.

The process of our invention is not applicable to the hydrogenation of cyanomethyl silicon compounds. According to our experience, as is hereinafter shown, the hydrogenation of cyanomethylalkoxysilanes results in a reaction which does not produce the expected aminoethylalkoxysilanes. In a like manner, the reaction disclosed and claimed in our above-identified copending application for the production of aminopropylalkoxysilanes, namely the reaction of ammonia with a gamma-chloropropylalkoxysilane, is not applicable to the production of beta-aminoethylalkoxysilanes by the reaction of ammonia with beta-chloroethylalkoxysilanes. As the compounds are apparently not stable, they cannot be recovered.

The following examples are illustrative of the invention:

EXAMPLE 1

Preparation of triethoxysilylbutylamine

To a 300 cc. pressure vessel were charged 0.21 mole (49 grams) of gamma-cyanopropyltriethoxysilane and 3 grams of Raney nickel. The vessel was then cooled in Dry Ice to a temperature of about −78° C. and 4 moles (68 grams) of liquid ammonia added thereto. The vessel was closed and hydrogen gas charged thereto until the pressure therein reached 2000 pounds per square inch. It was calculated that about 0.5 mole of hydrogen gas was added to the vessel. The vessel was then placed in a rocking autoclave and heated to a temperature of 100° C. for a period of 21 hours. After heating, the vessel was cooled to room temperature and the liquid product filtered and transferred to a 100 ml. distilling flask and fractionally distilled under reduced pressure through a 50 cm. Vigreaux column. Triethoxysilylbutylamine distilled at 123–124° C. under a reduced pressure of 15 mm. Hg. The compound has a density at 25° C. of 0.934 gram per cc. and a refractive index at 25° C. $N_d^{25}$ of 1.4222. Analyses for the element content, neutralization equivalent and molar refraction of the product were conducted and the results obtained compared with the calculated values for triethoxysilylbutylamine. The obtained and calculated data appear below.

|  | Calculated | Observed |
|---|---|---|
| Molar Refraction | 63.7 | 64.1 |
| Neutralization Equivalent | 235.4 | 238.5 |
| Percent OEt | 57.4 | 55.1 |
| Percent C | 51.0 | 47.9 |
| Percent H | 10.7 | 10.4 |
| Percent Si | 11.9 | 12.2 |
| Percent N | 5.9 | 5.7 |

A yield of about 85 mole percent was obtained. The same reaction conducted in the absence of ammonia resulted in a yield of about 20 mole percent.

EXAMPLE 2

*Preparation of mono-, bis- and tris(triethoxysilylbutyl)amine*

To a 3 liter pressure vessel were charged 0.73 mole (168.4) grams) of gamma-cyanopropyltriethoxysilane, 217.4 grams of ethanol and 2 grams of Raney nickel. The vessel was sealed, evacuated, filled with anhydrous ammonia until the pressure in the vessel reached about 130 p.s.i. gauge. Hydrogen was then charged to the vessel until the pressure therein reached 1500 p.s.i. The vessel was placed in a rocking autoclave and heated to a temperature of 120° C. for a period of 26 hours. After heating the vessel was allowed to cool to room temperature and the liquid product filtered to remove the catalyst and solids therein. The filtrate and washings were charged to a Vigreaux column, together with the filtrates and washings obtained from several additional reactions conducted in the manner set forth above, and fractionated. Triethoxysilylbutylamine distilled at a temperature of 67 to 74° C. under a reduced pressure of 0.65–0.75 mm. Hg and bis(triethoxysilylbutyl)amine distilled at a temperature of 144 to 160° C. under a reduced pressure of 0.55 mm. Hg (refractive index at 25° C. 1.4314–1.4369) while tris(triethoxysilylbutyl)-amine distilled at a temperature of 222 to 230° C. under a reduced pressure of 0.45 mm. Hg (refractive index at 25° C. 1.4444).

EXAMPLE 3

*Preparation of diethoxymethylsilylbutylamine*

To a 300 ml. stainless steel pressure vessel were charged 0.36 mole (72.5 grams) of gamma-cyanopropylmethyldiethoxysilane, 80 ml. absolute ethanol and 3.6 grams of Raney nickel. The vessel was cooled in Dry Ice to a temperature of about −78° C. and 0.4 mole (8 ml.) of liquid ammonia added thereto. The vessel was sealed and hydrogen charged thereto until the pressure therein reached approximately 1100 p.s.i. gauge. The vessel was then placed in a rocking autoclave and heated to a temperature of 80° C. After heating for a period of one hour the pressure in the vessel dropped to about 100 p.s.i.g. and hydrogen again charged thereto until the pressure therein reached 1100 p.s.i. gauge. The vessel was heated for an additional five hours at a temperature of 80° C. after which time it was allowed to cool to room temperature. The liquid product was filtered and the filtrate added to a distilling flask and fractionated under a reduced pressure. There was obtained 66.85 grams of diethoxymethyl silylbutylamine (a water white liquid) distilling at a temperature of 70 to 75° C. under a reduced pressure of 2.2 to 2.5 mm. Hg. Titration of the product by the standard HCl method indicated that the amino content of the compound was 7.9 percent and the neutralization equivalent was 205.3 (theoretical amino content for diethoxymethylsilylpropylamine—7.8 percent and theoretical nuetralization equivalent—205.3).

Delta-aminobutylmethyldiethoxysilane has a boiling point of 93 to 96° C. under a reduced pressure of 9 mm. Hg and a boiling point of 217° C. at atmospheric pressure. The compound has a refractive index ($N_d^{25}$ 1.4293, a viscosity at 25° C. of 2.0 cs.) a flash point of 200° F. and is completely miscible with acetone, benzene, dimethyl Cellosolve, chloroform, dioxane, ethanol, ethyl acetate, heptane and toluene.

EXAMPLE 4

*Preparation of dimethylethoxysilylbutylamine*

To a 300 cc. steel pressure vessel was charged 0.29 mole (50 grams) of gamma-cyanopropyldimethylethoxysilane, Raney nickel and 6 moles (100 cc.) of liquid ammonia. The vessel was sealed and hydrogen charged thereto until the pressure therein reached 1950 p.s.i. gauge. The vessel was then placed in a rocking autoclave and heated to a temperature of 115° C. for a period of 3 days. After heating the vessel was cooled to room temperature, the product removed therefrom and filtered. Distillation of the filtrate gave 25.0 grams of dimethylethoxysilylbutylamine boiling at a temperature of 80 to 82° C. under a reduced pressure of 10 mm. Hg. The compound was identified by infra-red analysis and by neutralization equivalent (theory 175, found 176).

EXAMPLE 5

*Preparation of triethoxysilylpentylamine*

Into a 300 cc. pressure vessel was placed 0.22 mole (54 grams) of delta-cyanobutyltriethoxysilane, 20 grams of anhydrous ethanol and 2 grams of Raney nickel. The vessel was closed, chilled with Dry Ice and anhydrous ammonia charged thereto until the pressure therein reached 125 p.s.i. gauge. Hydrogen was then charged to the vessel until pressure therein reached approximately 1500 p.s.i. gauge. The vessel was then placed in a rocking autoclave and heated at a temperature of 130° C. for a period of 12 hours. On cooling the vessel a pressure drop of 800 p.s.i. gauge was observed and hydrogen was again charged thereto until the pressure therein reached 1500 p.s.i. gauge. The vesel was reheated at a temperature of 130° C. for another 12 hour period. After cooling the vessel to room temperature, the contents thereof were filtered and the filtrate fractionally distilled under reduced pressure. Triethoxysilylpentylamine was distilled at a temperature of 73 to 74° C. under a reduced pressure of 0.5 mm. Hg and has a density of 25° C. of 0.926 gram per cc. and a refractive index $N_d^{25}$ of 1.426. Analysis of the product for elemental content, molar refraction and neutralization equivalent were conducted and the values obtained listed in the table below together with the corresponding calculated values for triethoxysilylpentylamine.

|  | Calculated | Observed |
|---|---|---|
| Molar Refraction | 68.3 | 68.7 |
| Neutralization Equivalent | 247.4 | 245 |
| Percent C | 53.4 | 52.9 |
| Percent H | 11.0 | 10.8 |
| Percent Si | 11.3 | 11.3 |
| Percent N | 5.7 | 5.7 |

EXAMPLE 6

*Preparation of triethoxysilylpropylamine*

To a 300 cc. stainless steel pressure vessel were charged 0.22 mole (48.5 grams) of beta-cyanoethyltriethoxysilane and 3 grams of Raney nickel. The vessel was then cooled in Dry Ice to a temperature of approximately −78° C. and 7.4 moles (100 ml.) of liquid ammonia added. The vessel was then closed and hydrogen gas charged thereto until the pressure therein reached 1900 pounds per square inch. The vessel was then placed in a rocking autoclave and heated for 16 hours at a temperature of 100° C. After heating, the vessel was cooled to room temperature and it was noted that the residual pressure therein was 1150 pounds per square inch. The products were filtered under argon through "Magnesol" (a commercial filter aid) to remove the nickel catalyst and the solids obtained were washed with anhydrous ether. The filtrate and washings were distilled in a 50 cm. Vigreaux column under reduced pressure. Triethoxysilylpropylamine distilled at 221° C. (741 mm. Hg) has a density of 0.937 gram per cc. at 25° C. and a refractive index, $N_d^{25}$ of 1.4198. Further analyses of the product for element content, neutralization equivalent and molar refraction were conducted and the data obtained compared with those calculated values for triethoxysilylpropylamine. The obtained and calculated data appears below.

|  | Calculated | Observed |
|---|---|---|
| Molar Refraction | 59.18 | 59.75 |
| Neutralization Equivalent | 221.3 | 229.5 |
| Percent OEt | 61.07 | 58.9 |
| Percent C | 48.83 | 50.9 |
| Percent H | 10.47 | 12.0 |
| Percent Si | 12.68 | 12.4 |
| Percent N | 6.33 | 6.5 |

The compound was also identified by infra-red analyses.

EXAMPLE 7

*Preparation of mono-, bis and tris(triethoxysilyl-beta-methyl-propyl)amines*

To a 300 cc. pressure vessel were charged 72 grams of beta-cyanopropyltriethoxysilane, 29 grams anhydrous ethanol and 2 grams of bis(cyclopentadienyl)nickel. The vessel was sealed and anhydrous ammonia charged thereto until the pressure in the vessel reached 125 p.s.i. gauge. Hydrogen was then charged to the vessel until the pressure therein reached 1600 p.s.i. gauge. The vessel was then placed in a rocking autoclave and heated to a temperature of 130° C. for a period of 12.5 hours. After heating the vessel was cooled to room temperature and the product (a liquid) filtered to remove the catalyst and solids therein which were subsequently washed with anhydrous isopropyl ether. The filtrate and washings were combined and distilled under reduced pressure to obtain the mono-, bis- and tris(triethoxysilyl-beta-methylpropyl) amines. The boiling points and the neutralization equivalent for each of the amines appear in the table below.

| Compound | Boiling Point (° C.) | Neutralization Equivalent | |
|---|---|---|---|
|  |  | Found | Theoretical |
| Triethoxysilyl-beta-methyl-propylamine. | 58° (0.25 mm.) | 224.7 | 221.3 |
| Bis(triethoxysilyl-beta methyl-propyl)amine. | 142° (0.25 mm.) | 420.0 | 425.6 |
| Tris(triethoxysilyl-beta-methyl-propyl)amine. | 180°-190° (0.2 mm.) | 604 | 629.9 |

EXAMPLE 8

*Preparation of diethoxymethylsilylpropylamine*

To a 3 liter steel pressure vessel were charged 0.5 mole (91 grams) of beta-cyanoethylmethyldiethoxysilane, 200 ml. of methanol and 2 grams of Raney nickel. The vessel was then cooled in Dry Ice to a temperature of about −78° C. and 10 moles (200 ml.) of ammonia added thereto. The vessel was sealed and hydrogen charged thereto until the pressure within the vessel reached 1400 p.s.i.g. The vessel was then heated at a temperature of 110° C. for a period of 24 hours. After heating, the vessel was cooled to room temperature and the liquid product was placed in a distilling flask and fractionated. There was distilled 23.9 grams of diethoxymethylsilylpropylamine at a temperature of 58 to 60° C. under a reduced pressure of 2.2 mm. Hg. Identification of the compound was also established by elemental analysis for nitrogen. The compound has a refractive index at 25° C. $N_d^{25}$ of 1.4270.

EXAMPLE 9

*Attempted preparation of triethoxysilylethylamine by the reaction of hydrogen with cyanomethyltriethoxysilane*

To a 300 cc. pressure vessel were charged 0.9 mole of cyanomethyltriethoxysilane with a small amount of bis-(cyanopentadienyl)nickel. The vessel was sealed and ammonia charged thereto until the pressure therein reached 125 p.s.i.g. Hydrogen was then charged to the vessel until the pressure therein reached 1200 p.s.i.g. The vessel was placed in a rocking autoclave and heated to a temperature of 130° C. for a period of 12 hours. The vessel was then cooled and the product therein comprised for the most part a non-distillable residue which indicated that decomposition of the starting cyano compound had occurred. The product did not contain aminoethyltriethoxysilane.

EXAMPLE 10

Based on quantitative data, delta-aminobutylonethyldiethoxysilane is poisonous to animals such as rabbits and the like by means of skin absorption. However, the compound is not poisonous to such animals when they are subjected to the compound by swallowing or inhalation.

What is claimed is:

1. An alkoxysilylbutylamine having the structural formula:

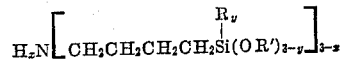

wherein R is taken from the group consisting of alkyl and aryl groups, R' represents an alkyl group, and ($x$) and ($y$) are numbers having a value of from 0 to 2.

2. A trialkoxysilylbutylamine.
3. Triethoxysilylbutylamine.
4. A dialkoxyalkylsilylbutylamine.
5. Diethoxymethylsilylbutylamine.
6. An alkoxydialkylsilylbutylamine.

7. A process for preparing an aminoalkylsilicon compound, wherein the amino group is removed by at least three carbon atoms from silicon, which comprises forming a mixture of (a) hydrogen, (b) a cyanoalkylsilicon compound wherein the cyano group is removed by at least two carbon atoms from silicon and wherein said silicon is connected to at least one member from the class consisting of alkoxy and silicon through silicon to oxygen to silicon linkage, the remaining unfilled valences of said silicon being satisfied by a member from the class consisting of alkyl, aryl, alkoxy and silicon through silicon to oxygen to silicon linkage, and (c) a hydrogenation catalyst, and heating the mixture to a temperature sufficiently elevated to cause said hydrogen and cyanoalkylsilicon compound to react to produce said aminoalkyl silicon compound.

8. A process for preparing aminoalkylsilicon compound, wherein the amino group is removed by at least three carbon atoms from silicon, which comprises forming a mixture of (a) hydrogen, (b) a cyanoalkylsilicon compound wherein the cyano group is removed by at least two carbon atoms from silicon and wherein said silicon is connected to at least one member from the class consisting of alkoxy and silicon through silicon to oxygen to silicon linkage, the remaining unfilled valences of said silicon being satisfied by a member from the class consisting of alkyl, aryl, alkoxy and silicon through silicon to oxygen to silicon linkage, (c) a hydrogenation catalyst, and (d) ammonia, and heating the mixture to a temperature sufficiently elevated to cause said hydrogen and cyanoalkylsilicon compound to react to produce said aminoalkyl silicon compound.

9. A process for preparing an aminoalkylsilicon compound, wherein the amino group is removed by at least three carbon atoms from silicon, which comprises forming a mixture of (a) hydrogen, (b) a cyanoalkylsilicon compound wherein the cyano group is removed by at least two carbon atoms from silicon and wherein said silicon is connected to at least one member from the class consisting of alkoxy and silicon through silicon to oxygen to silicon linkage, the remaining unfilled valences of said silicon being satisfied by a member from the class consisting of alkyl, aryl, alkoxy and silicon through silicon to oxygen to silicon linkage, (c) a hydrogenation catalyst, (d) ammonia, and (e) a liquid organic compound with which said hydrogen and cyanoalkylsilicon compound are non-reactive and in which said hydrogen, cyanoalkylsilicon compound and aminoalkylsilicon compound are soluble, and heating the mixture to a temperature sufficiently elevated to cause said hydrogen and cyanoalkylsilicon compound to react to produce said aminoalkyl silicon compound.

10. A process for preparing an aminoalkylalkoxysilane wherein the amino group is removed by at least three carbon atoms from the silicon atom thereof which comprises forming a mixture comprising (a) hydrogen, (b) a cyanoalkylalkoxysilane wherein said cyano group is removed by at least two carbon atoms from the silicon atom thereof and wherein the remaining valences of said silicon atom are connected to from one to three alkoxy groups and from 0 to 2 hydrocarbon groups selected from the class consisting of alkyl and aryl, the sum of said alkoxy groups and hydrocarbon groups connected to silicon being equal to 3, and (c) a hydrogenation catalyst, and heating the mixture to a temperature sufficiently elevated to cause said hydrogen and cyanoalkylalkoxysilane to react to produce said aminoalkylalkoxysilane.

11. A process for preparing an aminoalkylalkoxysilane wherein the amino group is removed by at least three carbon atoms from the silicon atom thereof which comprises forming a mixture comprising (a) hydrogen, (b) a cyanoalkylalkoxysilane wherein said cyano group is removed by at least two carbon atoms from the silicon atoms thereof and wherein the remaining valences of said silicon atom are connected to from one to three alkoxy groups and from 0 to 1 hydrocarbon groups selected from the class consisting of alkyl and aryl, the sum of said alkoxy groups and hydrocarbon groups connected to silicon being equal to 3, (c) a hydrogenation catalyst, and (d) ammonia, and heating the mixture to a temperature sufficiently elevated to cause said hydrogen and cyanoalkylalkoxysilane to react to produce said aminoalkylalkoxysilane.

12. A process for preparing aminoalkylalkoxysilanes which comprises forming a mixture of hydrogen, a cyanoalkylalkoxysilane, having the structural formula:

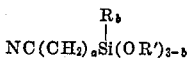

wherein R is taken from the group consisting of alkyl and aryl groups, R' represents an alkyl group, (a) is a number having a value of greater than one and (b) is a number having a value of from 0 to 2, ethanol, ammonia, and Raney nickel and heating the mixture to a temperature of from about 80 to 140° C. to cause said hydrogen and cyanoalkylalkoxysilane to react to produce aminoalkylalkoxysilanes.

13. A process for preparing aminoalkylpolysiloxanes which comprises forming a mixture of hydrogen, a cyanoalkylpolysiloxane having the structural formula:

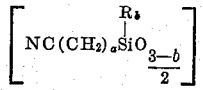

wherein R is taken from the group consisting of alkyl and aryl groups, (b) is a number having a value of from 0 to 2 and (a) is a number having a value of greater than one, a liquid organic compound in which hydrogen and said cyanoalkylpolysiloxane are soluble and with which said hydrogen, said cyanoalkylpolysiloxane and said aminoalkylpolysiloxane are non-reactive, ammonia and a Raney nickel catalyst and heating the mixture to a temperature of from about 80° C. to about 140° C. to cause said hydrogen and cyanoalkylpolysiloxane to react to produce an aminoalkylpolysiloxane.

14. A process for producing diethoxymethylsilylbutylamine which comprises forming a mixture of hydrogen, gamma-cyanopropylmethyldiethoxysilane, Raney nickel and ammonia and heating the mixture to a temperature of from about 80° C. to about 140° C. to cause said hydrogen and gamma-cyanopropylmethyldiethoxysilane to react to produce diethoxymethylsilylbutylamine.

15. A process for producing triethoxysilylpropylamine which comprises forming a mixture of hydrogen, beta-cyanoethyltriethoxysilane, Raney nickel and ammonia and heating the mixture to a temperature of from about 80° C. to about 140° C. to cause said hydrogen and beta-cyanoethyltriethoxysilane to react to produce triethoxysilylpropylamine.

References Cited in the file of this patent
UNITED STATES PATENTS

| | | |
|---|---|---|
| 2,557,802 | Sommer | June 19, 1951 |
| 2,715,133 | Speier | Aug. 9, 1955 |
| 2,754,284 | Speck | July 10, 1956 |
| 2,754,311 | Elliott | July 10, 1956 |
| 2,762,823 | Speier | Sept. 11, 1956 |
| 2,832,754 | Jex et al. | Apr. 29, 1958 |

FOREIGN PATENTS

| | | |
|---|---|---|
| 1,065,545 | France | Jan. 13, 1954 |
| 1,116,726 | France | Feb. 6, 1956 |

OTHER REFERENCES

Petrov et al.: "Doklady Akad. Nauk," USSR, vol. 100 (February 1955), pp. 711–14.